(12) United States Patent
Wendt et al.

(10) Patent No.: US 10,689,006 B2
(45) Date of Patent: Jun. 23, 2020

(54) MONITORING SYSTEM FOR AN AUTONOMOUS VEHICLE

(71) Applicant: Robert Bosch GmbH, Stuttgart (DE)

(72) Inventors: Hauke Wendt, Ditzingen (DE); Sergey Chirkov, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/778,712

(22) PCT Filed: Oct. 20, 2016

(86) PCT No.: PCT/EP2016/075166
§ 371 (c)(1),
(2) Date: May 24, 2018

(87) PCT Pub. No.: WO2017/089038
PCT Pub. Date: Jun. 1, 2017

(65) Prior Publication Data
US 2018/0326991 A1    Nov. 15, 2018

(30) Foreign Application Priority Data
Nov. 26, 2015    (DE) ................ 10 2015 223 429

(51) Int. Cl.
| | |
|---|---|
| *B60W 50/04* | (2006.01) |
| *G07C 5/08* | (2006.01) |
| *G07C 5/00* | (2006.01) |
| *H04L 29/08* | (2006.01) |

(52) U.S. Cl.
CPC ............ *B60W 50/04* (2013.01); *G07C 5/008* (2013.01); *G07C 5/0808* (2013.01); *G07C 5/0816* (2013.01); *B60W 2050/046* (2013.01); *H04L 67/12* (2013.01)

(58) Field of Classification Search
CPC ...... H02J 7/0047; H02J 7/0021; H02J 7/0036; H02J 2007/004; H02J 2007/0039; H02J 2007/0037; H01M 10/425; H01M 10/482; G03K 17/6874
See application file for complete search history.

(56) References Cited

U.S. PATENT DOCUMENTS

2015/0158499 A1    6/2015  Koravadi
2017/0090476 A1*   3/2017  Letwin ................ G05D 1/0077

FOREIGN PATENT DOCUMENTS

DE    102011015130 A1    12/2011
DE    102015202837 A1     8/2015

OTHER PUBLICATIONS

International Search Report dated Jan. 24, 2017, of the corresponding International Application PCT/EP2016/075166 filed Oct. 20, 2016.

(Continued)

*Primary Examiner* — Anne Marie Antonucci
(74) *Attorney, Agent, or Firm* — Norton Rose Fulbright US LLP; Gerard Messina

(57) ABSTRACT

A monitoring system for monitoring the control system of an autonomous vehicle is developed independently of the control system of the autonomous vehicle and is set up to monitor the functions of the control system in order to detect malfunctions of the control system and to report a detected malfunction of the control system to an external monitoring station.

12 Claims, 1 Drawing Sheet

(56) References Cited

OTHER PUBLICATIONS

Andreas Reschka et al: "A surveillance and safety system based on performance criteria and functional degradation for an autonomous vehicle", Intelligent Transportation Systems (ITSC), 2012 15TH International IEEE Conference on, IEEE, Sep. 16, 2012 (Sep. 16, 2012), pp. 237-242.
"Onstar System Puts Telematics on the Map", Electronic Design, Penton Media, Cleveland, OH, US, vol. 51, No. 7, Mar. 31, 2003 (Mar. 31, 2003), XP001160034, ISSN: 0013-4872 abstract p. 49-p. 56.
Joseph Funke et al: "Up to the limits: Autonomous Audi TTS", Intelligent Vehicles Symposium (IV), 2912 IEEE, IEEE, Jun. 3, 2012 (2012-06-93), pp. 541-547, XP032453003, DOI: 10.1109/IVS .2012.6232212 ISBN: 978-1-4673-2119-8 abstract; figure 2 p. 541, col. 1, line 1—p. 543, col. 2, line 36.

\* cited by examiner

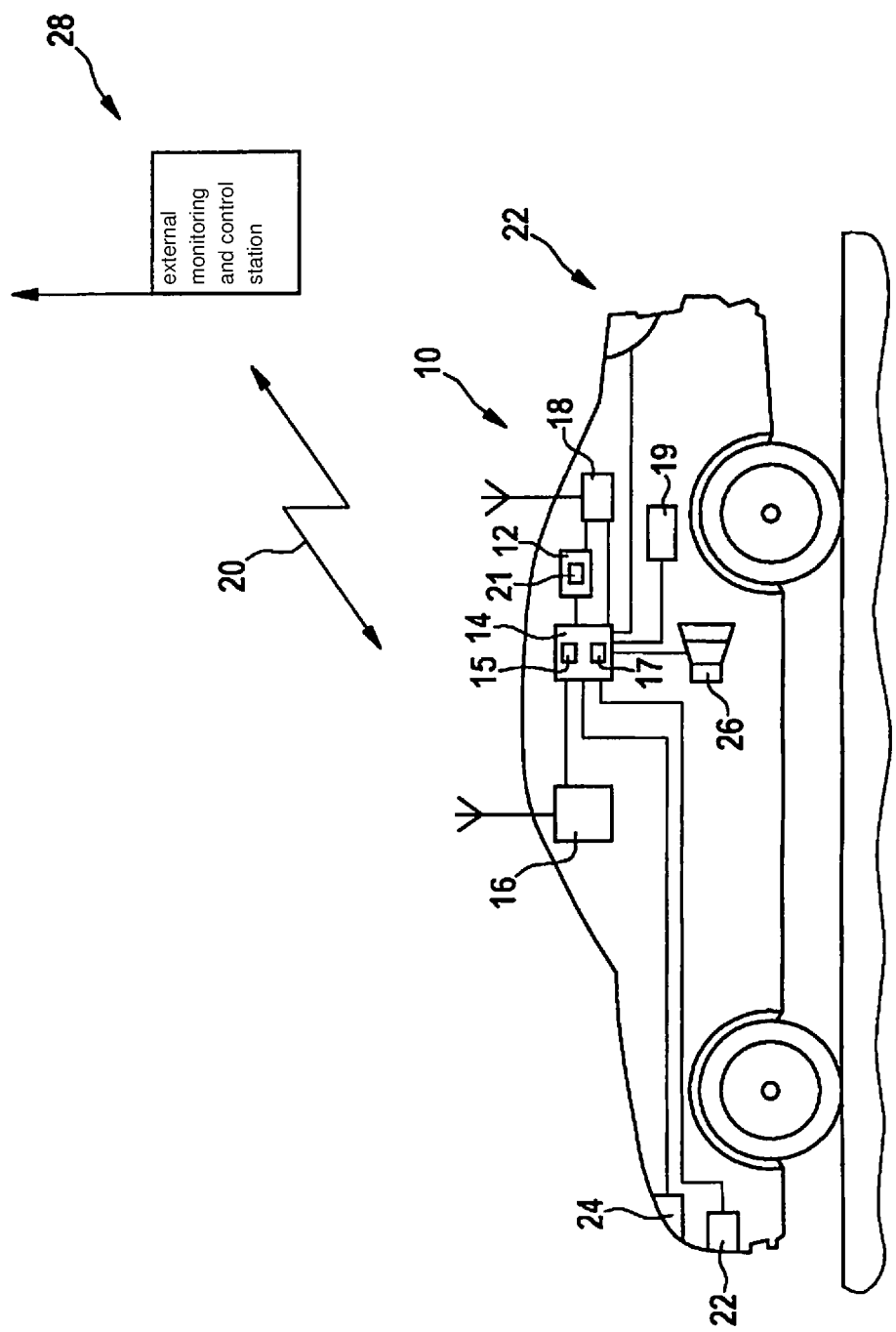

MONITORING SYSTEM FOR AN AUTONOMOUS VEHICLE

FIELD

The present invention relates to a method and a system for monitoring the control system of an autonomous vehicle as well as an autonomous vehicle that is equipped with such a monitoring system.

BACKGROUND INFORMATION

Autonomous vehicles will be part of road traffic in the foreseeable future. In such autonomous vehicles, it is not necessary for a driver to be present in the vehicle. This also eliminates the monitoring function of the driver. It is therefore necessary to monitor the function of the autonomous vehicle and its systems automatically.

If a defect occurs in an autonomous vehicle, which prevents autonomous driving, two fundamentally different cases must be distinguished: In the first case, the system is still capable of communicating with the infrastructure. In this case, the system of the autonomous vehicle itself is able to transmit a message in order to inform the owner about the defect and/or to get help. In the second case, the system is so defective that it is no longer able itself to transmit such a message.

It is therefore desirable to improve the monitoring of the operation of an autonomous vehicle in such a way that the defect is reported even in the second case.

SUMMARY

According to one exemplary embodiment of the present invention, a monitoring system for monitoring the control system of an autonomous vehicle is developed independently of the control system of the autonomous vehicle and is set up to monitor the functions of the control system in order to detect malfunctions of the control system and to report a detected malfunction of the control system to an external monitoring station situated outside of the autonomous vehicle.

According to one exemplary embodiment of the present invention, a method for monitoring the control system of an autonomous vehicle is developed to monitor functions of the control system using a monitoring system that is independent of the control system of the autonomous vehicle in order to detect malfunctions of the control system and to report a detected malfunction of the control system to an external monitoring station situated outside of the autonomous vehicle.

Exemplary embodiments of the present invention also comprise an autonomous vehicle having a control system that is developed to control the vehicle autonomously, and a monitoring system according to an exemplary embodiment of the present invention that is capable of monitoring the control system of the autonomous vehicle independently of the autonomous vehicle and to report a detected malfunction of the control system to an external monitoring station.

A method and a system for monitoring the control system of an autonomous vehicle make it possible to monitor the control system independently of the (remaining) function of the control system. It is thus possible to detect failures and malfunctions of the control system reliably, even if these resulted in the control system itself no longer being able to output an error message. This makes it possible to improve the operational reliability of an autonomous vehicle significantly.

In one specific embodiment, the monitoring system is developed to use a communication device existing in the autonomous vehicle in order to communicate with the external monitoring station. This makes it possible to save costs for an additional communication device and to keep the costs low for the monitoring system.

In one specific embodiment, the monitoring system is developed to use a communication device of its own, which is independent of the communication device of the autonomous vehicle, in order to communicate with the external monitoring station. This makes it possible to increase the operational reliability since a communication with the external monitoring station is possible even if the communication device of the autonomous vehicle is faulty.

In one specific embodiment, the monitoring system is developed initially to attempt to communicate with the external monitoring station via the communication device of the autonomous vehicle and to use its own communication device if the communication device of the autonomous vehicle is not functional. This makes it possible to achieve a particularly high operational reliability.

In one specific embodiment, the monitoring system is developed to communicate periodically with the control system of the autonomous vehicle and to output a failure message if the communication with the control system of the autonomous vehicle is cut off or is interrupted for longer than a specified time period. This makes it possible reliably to detect a complete failure of the control system, in which the control system itself is no longer capable of outputting an error message.

In one specific embodiment, following the detection of a malfunction of the control system, the monitoring system is developed to transmit to the monitoring station, in addition to an error message, also the current position of the autonomous vehicle. This makes it possible to guide the owner and/or service personnel quickly to the autonomous vehicle in order to rescue and/or repair the autonomous vehicle. The monitoring system may be developed in particular to determine the position with the aid of a satellite-based positioning system, for example the GPS system.

In one specific embodiment, the monitoring system is developed, following the detection of a malfunction of the control system, to activate at least one warning device of the autonomous vehicle, for example the emergency flasher, in order to warn the drivers of other vehicles located in the surroundings of the autonomous vehicle of the danger spot created by the no longer functional autonomous vehicle.

The type of message sent out by the communication device may also depend on the current position of the autonomous vehicle. The monitoring system may be developed in particular so that it sends out no warning message if the autonomous vehicle is located in a safe position, for example on a parking lot, where it represents no danger.

In one specific embodiment, the control system of the autonomous vehicle is developed so that it reports to the monitoring system the start and/or the end of a/each function performed by the control system. In this case, the monitoring system always has up-to-date information about the operating state of the autonomous vehicle and is able to output an error message if contradictions result from the reported information, e.g. because an acceleration process and a braking process are reported simultaneously.

The monitoring system may also be equipped with sensors of its own, in particular position, speed and/or acceleration sensors, in order to be able to monitor the operating state of the autonomous vehicle independently of the control system of the autonomous vehicle and its sensors.

The monitoring system may be developed in particular to deactivate the control system and to bring the autonomous vehicle to a standstill if it has detected a malfunction of the control system. In this manner, it is possible to increase the operational reliability of the autonomous vehicle even further since malfunctions of the control system may be detected even more reliably.

BRIEF DESCRIPTION OF THE DRAWINGS

An exemplary embodiment of the present invention is explained in greater detail with reference to the FIGURE.

The FIGURE shows, in a schematic representation, an exemplary embodiment of an autonomous vehicle 10, which is equipped with a monitoring system 14 according to an exemplary embodiment of the present invention.

DETAILED DESCRIPTION OF EXAMPLE EMBODIMENTS

The autonomous vehicle 10 has an electronic control system 12, which is developed to control the autonomous vehicle 10 autonomously, that is, independently of a human driver.

The details of control system 12 are not a subject matter of the present invention and are therefore not discussed further in the following.

In order to be able to detect a malfunction of control system 12 independently of control system 12, autonomous vehicle 10 is equipped with a monitoring system 14 designed to monitor the functions of control system 12 continuously, to detect malfunctions of control system 12 and to report a detected malfunction of control system 12 to an external monitoring and control station 28, i.e., a monitoring and control station 28 that is located outside of autonomous vehicle 10.

This report is provided in particular via a suitable data connection 20, which may be implemented via a usual mobile telephony network, for example.

In order to transmit the report, monitoring system 14 may use a communication device 18, which in normal operation is used by control unit 12, in order to communicate with external monitoring and control station 28 and to receive driving assignments.

Additionally, a further communication device 16 may be provided, which allows monitoring system 14 to communicate with external monitoring and control station 28 if the "normal" communication device 18, which is connected to control unit 12, is faulty or damaged.

Monitoring device 14 may be developed in particular to communicate with control system 12 periodically, that is, in specified time intervals, in order to monitor its functioning. If control unit 12 does not react within a specified time interval and/or transmits no message to monitoring device 14, monitoring device 14 infers a malfunction of control unit 12 and transmits a corresponding report to external monitoring and control station 28.

Monitoring device 14 also comprises a position determination device 15. With the aid of position determination device 15, monitoring device 14 is able to determine the current position of autonomous vehicle 10 independently of control unit 12 and to transmit it to the external monitoring and control station 28 when a malfunction of control unit 12 was detected. Position determination device 15 may comprise a receiver for a satellite-based navigation system and/or be based on other technologies and use for example mobile telephony networks and/or WLAN networks for position finding.

In one exemplary embodiment, monitoring device 14 comprises its own energy supply 17, for example, a battery or a rechargeable battery. This allows monitoring device 14 to transmit an error message to external monitoring and control station 28 even when the energy supply of autonomous vehicle 10 has failed.

By transmitting the current position of autonomous vehicle 10 to external monitoring and control station 28, the latter is able to send service personnel directly to the faulty autonomous vehicle 10 in order to remove the fault and to return autonomous vehicle 10 as quickly as possible into an operative state.

Monitoring device 14 is moreover designed to activate acoustic and/or optical warning devices 22, 24, 26, for example emergency flasher system 22, headlight/headlight flasher 24 and/or horn 26 of autonomous vehicle 10 in order to warn the surroundings of autonomous vehicle 10.

For example, emergency flasher system 22 may be activated if autonomous vehicle 10 broke down on the road and is no longer able to reach a safe place to stop, in particular a parking space.

If, while autonomous vehicle 10 is driving, monitoring device 14 should determine for example that the brake system is faulty and that it is therefore not possible to bring autonomous vehicle 10 immediately to a standstill, it may be expedient to warn the surroundings of autonomous vehicle 10 by activating headlight flasher 24 and/or horn 26, while at the same time an error message is transmitted to external monitoring and control station 28.

The monitoring device may also be connected to and/or equipped with sensors 19 of its own, in particular position, speed and/or acceleration sensors 19, which make it possible to monitor the function of control unit 12 independently of sensors 21 of control unit 12. In this manner, it is possible reliably to detect a malfunction of control unit 12 even when it is based on a malfunction of sensors 21 of control unit 12. Monitoring device 14 would not be able to detect such a malfunction, or would be able to do so only with difficulty, if it had to rely on information from the same sensors 21 as control unit 12.

What is claimed is:

1. A monitoring system for monitoring a control system of an autonomous vehicle, wherein the monitoring system is developed and set up independently of the control system of the autonomous vehicle:
   to monitor the functions of the control system in order to detect malfunctions of the control system; and
   to report a detected malfunction of the control system to an external monitoring station, wherein the control system is developed to report to the monitoring system at least one of a start and an end of a first function performed by the control system and at least one of a start and an end of a second function performed by the control system such that the monitoring system detects an error on the basis of a comparison of the at least one of the start and the end of the first function and at least one of the start and the end of the second function.

2. The monitoring system as recited in claim 1, the monitoring system is developed to use a communication device of the autonomous vehicle to communicate with the external monitoring station.

3. The monitoring system as recited in claim 2, wherein the monitoring is developed to use a communication device, which is independent of the communication device of the autonomous vehicle, to communicate with the external monitoring station.

4. The monitoring system as recited in claim 1, wherein the monitoring system is developed to communicate periodically with the control system of the autonomous vehicle.

5. The monitoring system as recited in claim 4, wherein the monitoring system is developed to report a malfunction of the control system when the communication with the control system of the autonomous vehicle is interrupted for longer than a specified period of time.

6. The monitoring system as recited in claim 1, wherein the monitoring system is developed to report the current position of the autonomous vehicle to the monitoring station after detecting a malfunction of the control system.

7. The monitoring system as recited in claim 1, wherein the monitoring system is developed to activate at least one warning device of the autonomous vehicle after detecting a malfunction of the control system.

8. The monitoring system as recited in claim 1, wherein the monitoring system includes at least one sensor on board the autonomous vehicle that bypasses the control system so that the monitoring system is adapted to monitor the functions of the control system independently of any sensor that is in communication with the control system.

9. An autonomous vehicle, comprising:
   a control system designed to control the vehicle in autonomous fashion; and
   a monitoring system for monitoring the control system, wherein the monitoring system is developed and set up independently of the control system of the autonomous vehicle:
      to monitor the functions of the control system in order to detect malfunctions of the control system, and
      to report a detected malfunction of the control system to an external monitoring station, wherein the control system is developed to report to the monitoring system at least one of a start and an end of a first function performed by the control system and at least one of a start and an end of a second function performed by the control system such that the monitoring system detects an error on the basis of a comparison of the at least one of the start and the end of the first function and at least one of the start and the end of the second function.

10. The autonomous vehicle as recited in claim 9, wherein the monitoring system includes at least one sensor on board the autonomous vehicle that bypasses the control system so that the monitoring system is adapted to monitor the functions of the control system independently of any sensor that is in communication with the control system.

11. A method for monitoring a control system of an autonomous vehicle, the method comprising:
   monitoring functions of the control system using a monitoring system, which is independent of the control system of the autonomous vehicle to detect malfunctions of the control system and to report a detected malfunction of the control system to an external monitoring station, wherein the control system is developed to report to the monitoring system at least one of a start and an end of a first function performed by the control system and at least one of a start and an end of a second function performed by the control system such that the monitoring system detects an error on the basis of a comparison of the at least one of the start and the end of the first function and at least one of the start and the end of the second function.

12. The method as recited in claim 11, wherein the monitoring includes monitoring the functions of the control system via at least one sensor on board the autonomous vehicle that bypasses the control system so that the monitoring is performed independently of any sensor that is in communication with the control system.

\* \* \* \* \*